United States Patent
Chopra et al.

(10) Patent No.: US 10,672,204 B2
(45) Date of Patent: Jun. 2, 2020

(54) REAL TIME STREAMING ANALYTICS FOR FLIGHT DATA PROCESSING

(71) Applicant: The Boeing Company, Chicago, IL (US)

(72) Inventors: Seema Chopra, Karnataka (IN); Sudheer Palyam, Karnataka (IN); James Schimert, Tukwila, WA (US); Timothy Joseph Wilmering, St. Louis, MO (US); Balaje Thumati, Seattle, WA (US)

(73) Assignee: The Boeing Company, Chicago, IL (US)

( * ) Notice: Subject to any disclaimer, the term of this patent is extended or adjusted under 35 U.S.C. 154(b) by 283 days.

(21) Appl. No.: 15/813,428

(22) Filed: Nov. 15, 2017

(65) Prior Publication Data

US 2019/0147670 A1 May 16, 2019

(51) Int. Cl.
*G07C 5/08* (2006.01)
*H04L 29/06* (2006.01)
*G05B 23/02* (2006.01)

(52) U.S. Cl.
CPC ....... *G07C 5/0808* (2013.01); *G05B 23/0243* (2013.01); *G07C 5/0825* (2013.01); *H04L 65/60* (2013.01); *G05B 2219/45071* (2013.01); *G07C 5/085* (2013.01)

(58) Field of Classification Search
CPC ...... G05B 2219/45071; G05B 23/0243; G07C 5/0808; G07C 5/0825; G07C 5/085; H04L 65/60
See application file for complete search history.

(56) References Cited

U.S. PATENT DOCUMENTS

| 8,209,083 B2* | 6/2012 | Ganguli | G05B 23/0254 701/3 |
| 8,234,279 B2 | 7/2012 | Wu et al. | |
| 9,418,493 B1 | 8/2016 | Dong | |
| 9,592,911 B2* | 3/2017 | Liu | B64C 39/024 |
| 2004/0243636 A1 | 12/2004 | Hasiewicz et al. | |

(Continued)

FOREIGN PATENT DOCUMENTS

| EP | 1 455 313 | 9/2004 |
| GB | 2 450 241 | 12/2008 |

OTHER PUBLICATIONS

Extended European Search Report prepared by the European Patent Office in Application No. EP 18 20 5894.1 dated Mar. 11, 2019.

*Primary Examiner* — Jerrah Edwards
(74) *Attorney, Agent, or Firm* — McDonnell Boehnen Hulbert & Berghoff LLP

(57) ABSTRACT

An example method includes receiving a plurality of data streams acquired for a respective parameter of a plurality of parameters indicating an operating condition of the aircraft, selecting at least one data stream corresponding to at least one parameter of the respective plurality of parameters, selecting a portion of data from the at least one data stream, comparing the portion of data to a model determined for the at least one parameter based on historical data, determining that a failure has occurred or is likely to occur during operation of the aircraft based on the comparing, and transmitting aircraft health monitoring information indicative of occurrence or likelihood of occurrence of the failure.

20 Claims, 8 Drawing Sheets

(56) References Cited

U.S. PATENT DOCUMENTS

2010/0241293 A1* 9/2010 Ganguli ............ G05B 23/0254
　　　　　　　　　　　　　　　　　　　　　701/4
2012/0290166 A1　11/2012 Wallace et al.
2014/0222325 A1　 8/2014 Followell et al.
2016/0068267 A1* 3/2016 Liu ..................... B64C 39/024
　　　　　　　　　　　　　　　　　　　　　701/11
2016/0153806 A1　 6/2016 Ciasulli et al.

* cited by examiner

REAL TIME STREAMING ANALYTICS FOR FLIGHT DATA PROCESSING

FIELD

The present disclosure relates generally to real time streaming analytics for flight data processing.

BACKGROUND

A vehicle health management system may be used to monitor the operating health of a vehicle, such as an aircraft, a spacecraft, a ground vehicle, a watercraft, or other machinery. An example vehicle health management system includes a data processing system and one or more sensors. The sensors may be integrated with a vehicle or otherwise configured to generate data relating to operating conditions of the vehicle. The data processing system may be configured to receive data from the sensors and process the data to determine a current state or health of the overall vehicle or of one or more particular vehicle components to predict a future state of the vehicle, and perhaps to perform or trigger other actions based on processing of the data.

Vehicles may incorporate data processing systems for receiving and processing sensor data in real time and/or for storing the sensor data for offline processing, such as during a vehicle maintenance operation. In one example, an aircraft may include various sensors for collecting data relating to operating conditions of an engine, safety systems, fluid levels, climate control systems, flow valve states, and the like. In this example, the aircraft also includes a data processing system for processing the sensor data and notifying a user of the operating conditions of the vehicle, such as by activating a due maintenance notification or by providing other alerts.

In another example, a vehicle management system monitors the health of a fleet of many vehicles, such as a fleet of aircraft. In this example, each aircraft may include numerous sensors, such as acoustic sensors, environmental sensors, accelerometers, stress/strain sensors, pressure sensors, and the like, and each sensor may be configured to continuously, intermittently, or periodically collect data relating to the aircraft. Like in the above example, each aircraft may include a data processing system for receiving and processing data from the sensors in real-time to assist with operation of the aircraft or assessing operating health of the aircraft.

The data processing system of each aircraft may be configured to communicate the sensor data continuously to a data processing system. Generally, the data processing system receives large amounts of data from the fleet of vehicles. The large amounts of data present challenges in effectively processing the data in real time to provide useful and timely health status information to help manage the health of the fleet of aircraft as a whole.

It is thus desirable to improve on the existing systems or at least to provide one or more useful alternatives to help make vehicle health management systems more efficient and faster in processing of data, and to improve real-time intelligence regarding the health status of one or more vehicles.

SUMMARY

The present disclosure describes embodiments that relate to a real time streaming analytics for flight data processing.

In one aspect, the present disclosure describes a method implemented by a computing device for data stream analytics for an aircraft. The method includes: (i) receiving a plurality of data streams acquired for a respective parameter of a plurality of parameters indicating an operating condition of the aircraft, where the aircraft is configured to operate in different flight modes, each flight mode being associated with a respective set of operating rules; (ii) selecting, from the plurality of data streams, at least one data stream corresponding to at least one parameter of the respective plurality of parameters; (iii) selecting a portion of data from the at least one data stream based on which flight mode the aircraft is operating in when the portion of data is acquired; (iv) comparing the portion of data to a model determined for the at least one parameter based on historical data; (v) determining that a failure has occurred or is likely to occur during operation of the aircraft based on the comparing; and (vi) transmitting aircraft health monitoring information indicative of occurrence or likelihood of occurrence of the failure.

In another aspect, the present disclosure describes a flight data processing system. The flight data processing system includes a flight data conversion computing device having one or more processors configured to (i) receive, from a flight data warehouse, raw time-space data points of a plurality of data streams acquired for a respective parameter of a plurality of parameters indicating an operating condition of an aircraft, where the aircraft is configured to operate in different flight modes, each flight mode being associated with a respective set of operating rules, and (ii) convert the raw time-spaced data points of the plurality of data streams into measurements representing variation of the plurality of parameters over time. The flight data processing system also includes a database in communication with the flight data conversion computing device and configured to store converted plurality of data streams generated by the flight data conversion computing device. The flight data processing system further includes a streaming analytics module in communication with the flight data conversion computing device or the database, where the streaming analytics module includes one or more processors, and memory storing thereon instructions, that when executed by the one or more processors, cause the streaming analytics module to perform operations. The operations include (i) selecting, from the converted plurality of data streams, at least one data stream corresponding to at least one parameter of the respective plurality of parameters; (ii) selecting a portion of data from the at least one data stream based on which flight mode the aircraft is operating in when the portion of data is acquired; (iii) comparing the portion of data to a model determined for the at least one parameter based on historical data; (iv) determining that a failure has occurred or is likely to occur during operation of the aircraft based on the comparing; and (v) transmitting aircraft health monitoring information indicative of occurrence or likelihood of occurrence of the failure.

In still another aspect, the present disclosure describes a non-transitory computer readable medium having stored therein instructions that, in response to execution by a computing device for data stream analytics for an aircraft, cause the computing device to perform operations including: (i) receiving a plurality of data streams acquired for a respective parameter of a plurality of parameters indicating an operating condition of the aircraft, wherein the aircraft is configured to operate in different flight modes, each flight mode being associated with a respective set of operating rules; (ii) selecting, from the plurality of data streams, at least one data stream corresponding to at least one parameter of the respective plurality of parameters; (iii) selecting a portion of data from the at least one data stream based on which flight mode the aircraft is operating in when the portion of data is acquired; (iv) comparing the portion of data to a model determined for the at least one parameter based on historical data; (v) determining that a failure has occurred or is likely to occur during operation of the aircraft based on the comparing; and (vi) transmitting aircraft health monitoring information indicative of occurrence or likelihood of occurrence of the failure.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Figure 1:
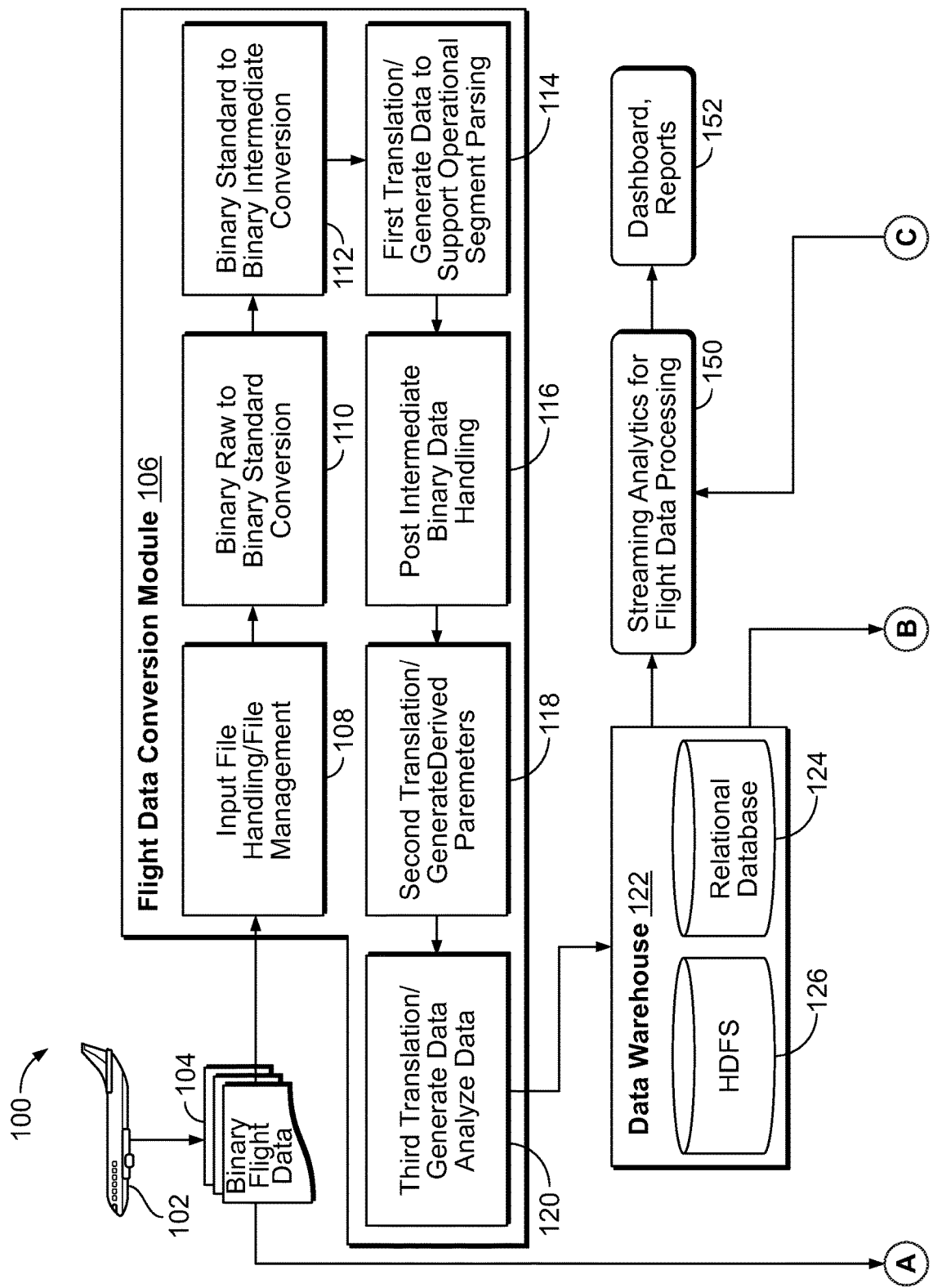
FIG. 1 illustrates a block diagram of a flight data processing system, in accordance with an example implementation.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Within examples, innovative methods and systems for real time streaming analytics for flight data processing are disclosed. As used herein, real time processing refers to real-time computing, or reactive computing that describes hardware and software systems subject to a "real-time constraint," for example, from event to system response. Real-time programs respond within specified time constraints. For example, real time responses can be in the order of milliseconds, and sometimes microseconds. A real-time system may be a system that controls an environment by receiving data, processing them, and returning the results sufficiently quickly to affect the environment at that time.

The methods and systems disclosed herein may be particularly useful for effective and timely processing large data sets that are received in high volumes, at high speeds, and/or in a range of different types from many different sources. Commonly used hardware and software tools may be unable to capture, process, and extract useful information from large amounts of data (for instance, ranging from a few terabytes to tens of petabytes or more of data) within tolerable time frames. In addition to processing large data sets, the methods and systems disclosed herein may also be useful for effectively processing relatively small data sets.

For illustration purposes, features, operations, and other aspects are described with respect to health management systems that are configured to process data received from an aircraft or a database storing information captured for the aircraft. However, the features and functions disclosed herein may also be applicable to other types of vehicles, machinery, and devices, and to other types of data.

Generally, the use of health management systems may have various benefits. For example, a health management system may be able to identify failures or anomalies or inefficient performance of aircraft components and to take intelligent corrective and repair actions before minor issues develop into major repairs and increased aircraft downtime. The health management system may also be able to identify efficient or acceptable performance of aircraft components and to costly-effectively schedule maintenance operations. Consequently, the health management system may be used to reduce the time that an aircraft is out of service for maintenance and repairs.

An example flight data processing system may receive data from several airline operators for thousands of flights and flight segments per day, and the data may be acquired at a high frequency. As a result, the flight data processing system may receive a large amount of data to process and determine the health of a particular aircraft.

Disclosed herein are systems and methods for allowing the flight data processing system to handle such a large amount and frequency of data and make timely and effective assessment of a condition of the aircraft. Particularly, the flight data processing systems and methods disclosed herein may facilitate providing faster, timely, and automated insights into aircraft performance and behavior.

Figure 2:
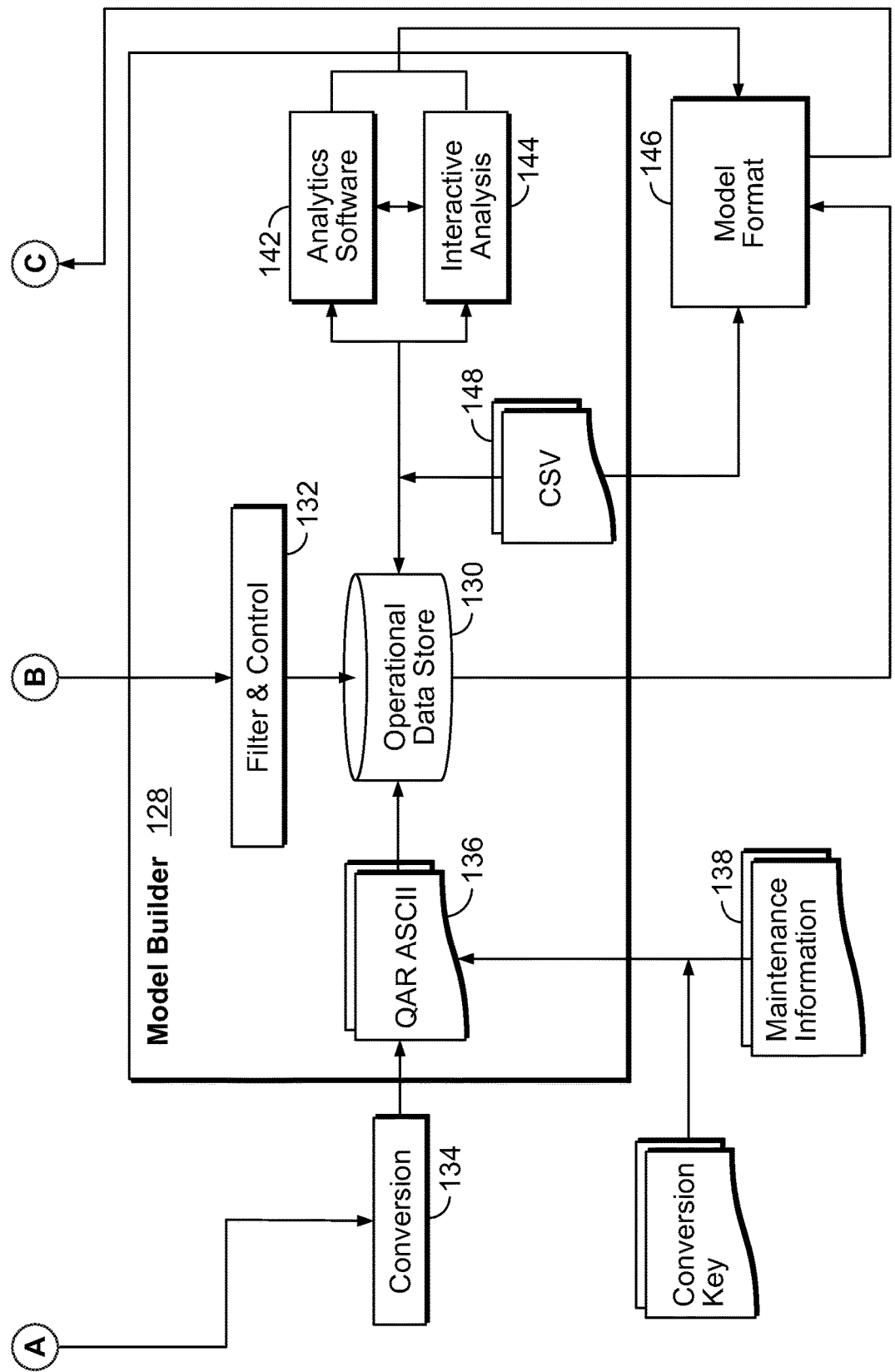
FIG. 2 illustrates a continuation of the block diagram shown in FIG. 1, in accordance with an example implementation.

FIGS. 1 and 2 illustrate a block diagram of a flight data processing system 100, in accordance with an example implementation. The flight data processing system 100 or portions thereof may be onboard an aircraft 102 or may be located at a remote location and in communication with the aircraft 102 by way of a data link. A data link refers to a communication link that connects one location to another for the purpose of transmitting and receiving digital information. It can also refer to a set of electronics assemblies, including a transmitter and a receiver (two pieces of data terminal equipment) and the interconnecting data telecommunication circuit. These components may operate based on a link protocol enabling digital data to be transferred from a data source to a data sink.

Aircraft systems and sensors onboard the aircraft 102 collect data for parameters that indicate the condition or health of the aircraft 102. The parameters may include for example, temperatures of fluids, velocity, valve conditions, flow rates and/or pressures in hydraulic or pneumatic systems, electric voltages and currents at different nodes in the electric system of the aircraft 102, etc. Each of these parameters may have a corresponding data stream that shows the value of a respective parameter and its variation over time. The parameters may be sampled at a particular frequency based on the nature of the parameter and how frequently it changes, for example.

The flight data processing system 100 may include a binary flight data module 104 configured to receive this data in binary or other format from the aircraft 102. The binary flight data module 104 may receive data for thousands of parameters from hundreds or thousands of aircrafts for different flights, flight segments, or tails. Thus, the binary format provides an efficient way of storing such a large amount of data.

The flight data processing system 100 may include a flight data conversion module 106 configured to translate or convert the data from the binary format into, for example, sensor measurements in engineering units that facilitate processing of the data in an effective and meaningful way. For example, binary format for a flow rate parameter of a particular valve may be converted from binary numbers to values in cubic foot or inch per second.

The flight data conversion module 106 may include several submodules that process the data received in the binary format until conversion to engineering units. For example, the flight data conversion module 106 may include an input file handling/file management module 108 configured to receive, handle, and prepare the data received from the binary flight data module 104. A binary-raw-to-binary-standard conversion module 110 receives raw binary data from the input file handling/file management module 108 and converts the binary raw data of the data streams into standard binary format. A binary-standard-to-binary-intermediate conversion module 112 converts the data in standard binary format to binary intermediate format.

A first translation module 114 is in communication with the binary-standard-to-binary-intermediate conversion module 112 and is configured to translate or convert the data from binary intermediate format into a format that supports operational segment parsing to facilitate subsequent processing (i.e., support subsequent building of a data structure such as a parse tree, syntax tree or other hierarchical structure, giving a structural representation of the input data). A post intermediate binary data handling module 116 further processes the data generated by the first translation module 114 to prepare the data for a second translation by a second translation module 118 that is configured to generate derived parameter values (e.g., fitting curves to parameter values in a particular segments of the data and extract derived parameters from the fitted curve). Then, a third translation module 120 receives the converted data generated by the second translation module 118 and generates data in a format that facilitates storage, processing, and analysis of the data.

Then, a data warehouse (DW) 122 receives the data generated by the third translation module 120. The DW 122 may include a relational database 124 that is designed for query and analysis and may consolidate data from several sources. The relational database 124 may store and manage the data received from the third translation module 120. The relational database 124 may be distributed among several servers and nodes to increase the amount of data that can be stored, and the relational database 124 may be configured to spread the workload among the servers.

In an example, in addition to the data received from the third translation module 120, the relational database 124 may also include other field reports, manual maintenances, or other data collected historically for various components of an aircraft such as the aircraft 102. In an example, the relational database 124 may be configured to have text analytics to track unstructured data, such as word processor documents, and semi-structured data, such as spreadsheets. In this manner, the relational database 124 may be configured to handle data received in various formats. The relational database 124 may also be configured to have an extraction, transportation, transformation, and loading (ETL) solution capability, online analytical processing (OLAP) and data mining capabilities, client analysis tools, and other applications that manage the process of gathering data and delivering it for further processing by other modules of the flight data processing system 100.

In an example, the DW 122 may also include a Hadoop Distributed File System (HDFS) 126. The HDFS 126 may include a distributed, scalable, and portable file system that may have nominally a single name-node plus a cluster of data-nodes. Each data-node may serve up blocks of data over the network using a block protocol specific to the HDFS 126. The file system of the HDFS 126 may, for example, use TCP/IP sockets for communication, and clients may be configured to use remote procedure call (RPC) to communicate between each other.

The HDFS 126 may be configured to store large data files (typically in the range of gigabytes to terabytes) across multiple machines. This arrangement achieves reliability by replicating the data across multiple hosts. Data nodes can talk to each other to rebalance data, to move copies around, and to keep the replication of data high. The HDFS 126 may be designed for portability across various hardware platforms and compatibility with a variety of underlying operating systems.

The HDFS 126 may organize the converted data streams received from the third translation module 120 into a parallel file system that facilitate parallel processing of the data instead of processing the data in series. This way, the data could be processed in real-time or near real-time and facilitate making timely assessments of the condition of the aircraft 102.

The DW 122 thus stores and maintains the data overtime. As time passes, older data may serve as historical data that may help build models for behavior of a health aircraft as described next.

The flight data processing system 100 may further include a model builder 128, which includes a historical data processing computing device. The model builder 128 may be configured to provide a framework for integrating data scientists to view and analyze historical data and create health management models. The model builder 128 may generate models for the various parameters associated with the aircraft 102 indicating, for example, how these various parameters should vary over time for a healthy aircraft. These models may thus server as a benchmark against which currently received data (real-time data) received from the aircraft 102 could be compared to determine status of the aircraft 102.

The model builder 128 may include an operational data store (ODS) 130 that is configured to have access to both historical data stored in the DW 122 and real-time data generated by the aircraft 102. Particularly, the model builder 128 may include a filter and control module 132 that is configured to query the DW 122 to obtain specific data to analyze and build a model for a particular aircraft system issue. Further, the binary flight data module 104 may also transmit the real time data received from the aircraft 102 directly to a translation or conversion module 134 that converts the binary data into another format such as ASCII engineering unit format, as shown by block 136, which may be usable by the ODS 130. The ODS 130 may also have access to maintenance information 138 (e.g., messages, reports, manuals, etc.) and conversion key block 140 that is used to unpack the binary data into its corresponding engineering units.

An analytics software 142 may be running on a computing device (e.g., a server) associated with the model builder 128. The analytics software 142 provides an interactive environment to extract, view, manipulate, transform, and visualize the aircraft system data as well as built-in utilities to create the analytics model that is ultimately configured and deployed in the streaming processing environment. The analytics software 142 may be configured to generate a model based on the data stored in the ODS 130. As an example for illustration, the data may include flow rates through a particular flow valve on the aircraft 102. The analytics software 142 may query the ODS 130 to obtain historical data stored therein that shows how a healthy flow valve operates, i.e., data of flow rates associated with a healthy valve. The analytics software 142 may then build a model, such as a regression model, or a curve fitted to the data. This process is repeated to represent the progression over time of conditions, which deviate from the healthy state, thus modeling unhealthy behavior. The generated model may go through revisions, training, and tuning through interactive analysis as shown at block 144. The interactive analysis may be performed through human feedback, automatic feedback from other software, predicted performance data provided by a manufacture, etc.

The model generated by the analytics software 142 may be processed at a model format module 146 to provide the model in a form that could be used for further processing in various analytics and visualization tools. As an example, the model format module 146 may convert or provide the model as numerical values provided in a comma-separated values (CSV) format for Excel Quick view. In another example, the model format module 146 may include a Spotfire server, a Tableau server, or an R Server configured to provide the model in a format usable for further processing. Other example formats and formatting methods may be used. Further, in an example, the model format module 146 may have direct access to data stored in the ODS 130. For instance, the data stored in the ODS 130 may be provided to the model format module 146 in CSV format as shown by block 148.

The flight data processing system 100 may also include a streaming analytics module 150. The streaming analytics module 150 is in communication with the DW 122 and may be configured to process the data streams received thereat in real time or near real time to make timely assessments of the condition of the aircraft 102. The term "near real time" may refer to a time delay (e.g., 200 milliseconds, 1 minute, etc.) introduced by data processing or network transmission between the occurrence of an event and the use of the processed data. In examples, if the streaming analytics module 150 is onboard the aircraft 102, then real time or near real time event processing may occur. In other examples, if the streaming analytics module 150 is offboard, then latencies may be introduced by the data download and transmission process, which could be minutes to days of latency, followed by the latencies introduced by the data processing system, which includes data load, queuing for translation, the translation process itself. The streaming analytics module 150 also has access to the models built by the model builder 128 and provided to the ODS 130 or the DW 122, and is configured to compare the data streams with the models generated by the model builder 128 to assess the condition of the aircraft 102.

For instance, the streaming analytics module 150 may query the DW 122 to obtain or select a data file corresponding to a particular parameter such as flow rate of a particular flow valve on the aircraft 102. The streaming analytics module 150 may be configured to process the data stream or a portion thereof to determine real time characteristics (e.g., statistical values such as mean, standard deviation, etc.) for the flow valve. The model builder 128 may have generated a model for how the flow rates of the flow valve should vary over time and also determined characteristics of both healthy and failed valves. The model builder 128 may provide the model and the characteristics of a healthy and failed flow valve to the streaming analytics module 150, which compares the model and characteristics to the real time characteristics determined based on the data stream.

Based on the comparison, the streaming analytics module 150 determines whether the flow valve is operating properly and is healthy or not. If not, then the streaming analytics module 150 may determine that a failure has occurred during operation of the aircraft 102 or is likely to occur, and that the flow valve is due for maintenance or replacement. The flow valve example is for illustration only, and the streaming analytics module 150 may be configured to process various components of the aircraft 102 in parallel in real time to determine the condition of the aircraft 102.

The streaming analytics module 150 may then transmit its determinations and findings regarding the condition of the aircraft 102 to dashboards and generate reports for proper parties to visualize, examine, and make decisions regarding operation of the aircraft 102 as shown by the dashboard and reports module 152. For instance, the reports could be provided to maintenance crews on the ground, who may determine that one or more components of the aircraft 102 are due for maintenance when the aircraft 102 lands. Operations performed by the streaming analytics module 150 are described in more details below with respect to FIG. 3.

Components of the flight data processing system 100 may be configured to work in an interconnected fashion with each other and/or with other components coupled to respective systems. One or more of the described operations or components of the flight data processing system 100 may be divided up into additional operational or physical components, or combined into fewer operational or physical components. In some further examples, additional operational and/or physical components may be added to the examples illustrated by FIGS. 1 and 2. Still further, any of the components or modules of the flight data processing system 100 may include or be provided in the form of a processor (e.g., a microprocessor, a digital signal processor, etc.) configured to execute program code including one or more instructions for implementing logical operations described herein. The flight data processing system 100 may further include any type of computer readable medium (non-transitory medium) or memory, for example, such as a storage device including a disk or hard drive, to store the program code that when executed by one or more processors cause the flight data processing system 100 to perform the operations described above. In an example, the flight data processing system 100 may be included within other systems.

Figure 3:
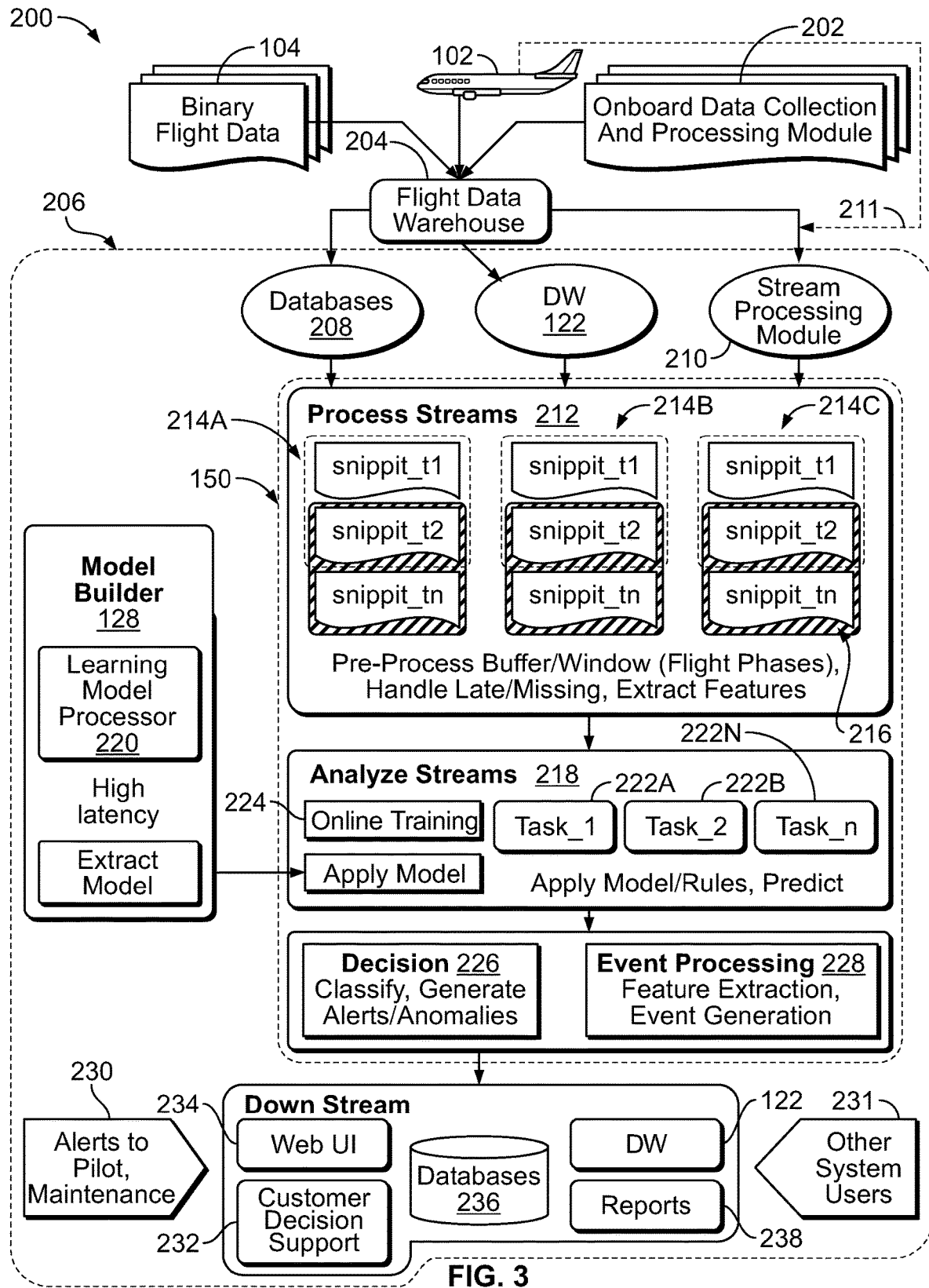
FIG. 3 illustrates a process flow for a flight data processing system, in accordance with an example implementation.

FIG. 3 illustrates a process flow 200 for a flight data processing system, in accordance with an example implementation. As shown in FIG. 3, data streams may be provided from the aircraft 102 and possibly many other aircrafts to the binary flight data module 104. The aircraft 102 may also have an onboard data collection and processing module 202 configured to monitor operations of the aircraft 102. The onboard data collection and processing module 202 may include hardware components, software, or a combination thereof.

Either or both of the binary flight data module 104 or the onboard data collection and processing module 202 may provide the streamed data as files to a flight data warehouse 204. The flight data warehouse 204 may, for example, include or be in communication with a flight data conversion module, e.g., the flight data conversion module 106 configured to convert the aircraft data files into measurements in engineering units.

The flight data warehouse 204 may then provide the converted data files to a flight data processing system 206. The flight data processing system 206 could be similar to the flight data processing system 100 described above, or may include more or fewer components than the flight data processing system 100.

The flight data warehouse 204 may particularly provide the converted data streams to databases 208 for storage and future processing, to the data warehouse (DW) 122, or a stream processing module 210. The stream processing module 210 converts the data files back to data streams and is configured to facilitate parallel processing of the data streams by other modules in communication therewith. For example, multiple computational units may process the data streams without explicitly managing allocation, synchronization, or communication among those units.

In an example, the aircraft 102 may directly transmit the data streams to the stream processing module 210 as indicated by arrow 211.

The streaming analytics module 150 described with respect to FIGS. 1 and 2 may be in communication with one or more of the databases 208, the DW 122, or the stream processing module 210. The streaming analytics module 150 may be configured to process the data streams, analyze the data streams to determine events of interest, then further process these events to decide whether a failure has occurred or is likely to occur or an anomaly has occurred, and transmit the results to various entities that can make use of thereof as described above.

Processing streams is illustrated by block 212. In an example, each data stream may represent a corresponding parameter (e.g., temperature, velocity, flow, etc.) and may initially be processed separately. The block 212 illustrates three data streams 214A, 214B, and 214C being processed as an example for illustration only. Hundreds or thousands of streams may be processed in parallel. A "snippet_t1" of a particular data stream, e.g., the data stream 214A, is a data point or a group of data points received at time=t1. Similarly, "snippet_t2" and "snippet_t3" of a particular data stream, e.g., the data stream 214A, are data points or groups of data points received time=t2 and time=t3, respectively.

Several processes may be performed on the data streams 214A, 214B, and 214C by the streaming analytics module 150 at the block 212. For example, the streaming analytics module 150 may query one or more of the databases 208, the DW 122, or a stream processing module 210 to select a particular data stream, e.g., select flow rate data stream captured by a flow sensor for a particular valve. The streaming analytics module 150 may then select a portion of the particular data stream by buffering or applying a window such as window 216. By applying the window 216 as an example for illustration, the streaming analytics module 150 processes "snippet_t2" and "snippet_t3" of the stream 214C, while discarding "snippet_t1" at least for a particular current analysis.

Selecting the portions of data may be based on several factors. For example, a portion may be selected based on a flight phase or mode in which the aircraft 102 was operating. The aircraft 102 goes through several flight modes or operational flight phases during flight. An operational flight mode or phase may be defined as the current operational purpose of the flight or ground segment from the perspective of the pilot or operator. Example operational phases, part of nearly every flight segment, include preflight, engine taxi out, take-off, climb-out, cruise, descent, approach, landing, taxi-in, engine shut-down, and post-flight. Additional operational modes can be defined for emergency events or optional operational activities such as de-ice, return-to-service engine checks, ferry flights, etc.

The aircraft 102 may be configured to operate in each of these phases according to a respective set of rules and operating procedures. For example, during preflight, the flight crew checks the operational status of aircraft systems and configures those systems for the intended operation. In many cases, the operational flight phase determines how systems of the aircraft 102 are used or are expected to operate. For instance, the maximum flow through a valve may different based on flight mode or phase. Thus, based on an issue, a failure, potential failure, anomaly, or a problem that the streaming analytics module 150 seeks to detect, the streaming analytics module 150 may isolate or select a portion of the data stream that correspond to a particular flight mode or phase or a group of flight phases during which the failure or anomaly may occur.

In another example, the streaming analytics module 150 may select the portion of data based on a sequence of events that should occur on the aircraft 102 during a particular phase. As mentioned above, the operational flight phase determines how systems of the aircraft 102 are used. For example, when in the takeoff operational flight phase, the parking brake is not set while the engines are brought up to takeoff thrust. However, when performing a return-to-service engine check, the parking brake must be set while the engines are brought up to high thrust. Thus, the streaming analytics module 150 may select the portion of data during a particular operation flight phase to assess whether a particular sequence of events happened as it should or not, and thus whether a failure or an anomaly occurred or not.

In another example, the streaming analytics module 150 may select the portion of data based on detecting a special event, such as a hard landing of the aircraft 102. For instance, if the data shows or indicates occurrence of a particular event at a particular period of time, the streaming analytics module 150 may be triggered to buffer or apply a window to select the portion of data following the event. In examples, the special event may be any event that is not initiated by the pilot. For instance, movement of a flap or a control surface without the pilot initiating or commanding such movement may be considered a special event that triggers buffering, windowing, or selecting the portion of the data following such event.

In another example, processing the streams 214A-C may include compensating for any gaps in the data streams. For example, a data stream may be obtained at a particular frequency. If the particular frequency is low, then there might be periods of time where no data points exist in the data stream. These gaps may preclude identifying high frequency events, failures, or anomalies that might occur and end quickly. In another example, gaps in the time series data of the data streams may be caused by noise in the sensing equipment or the local environment on the aircraft 102.

To compensate for these gaps and estimate the missing data points, the streaming analytics module 150 may, for example, apply a low pass filter to remove any undesirable high frequency noise components within the data stream, and may apply mathematical models to derive a regression curve and estimate missing points in the gaps. In an example, the streaming analytics module 150 may interpolate between data points and or apply some other mathematical technique to estimate the missing points.

In still another example, the streaming analytics module 150 may combine two or more data streams or portions thereof into a single data stream. For example, the streaming analytics module 150 may receive a data stream from the DW 122 and another from the stream processing module 210. Although time series data streams should be received in the order the data points are captured, in some examples, the data streams may arrive out of order form a temporal stand point. For instance, translation or conversion of a first data stream may take a longer time than a second data stream, and may thus arrive later than the second data stream even though some of its data points are acquired earlier in time. The streaming analytics module 150 may thus reorder data segments from the different data streams to construct the data stream such that the data stream represents variation of a corresponding parameter in a time-based sequential order. The streaming analytics module 150 may also employ windowing techniques to cache early arriving data elements for later synchronization with late arriving elements.

Processing the streams may also include extracting features from the data streams in real time that indicate characteristics of the corresponding parameters. For example, the streaming analytics module 150 may be configured to determine statistical variables for a particular data stream of a flow rate for a particular valve. These statistical variables may include, for example, maximum flow, minimum flow, standard deviation of flow, mean flow, etc. Extracting such features facilitate processing the data stream in real time because the streaming analytics module 150 may use these features to analyze the data stream instead of analyzing all or a subset of data points of the data stream. In other words, instead of processing thousands of data points to determine the condition of the aircraft 102, the streaming analytics module 150 may rely on a few extracted features that represent variation of the parameter to determine the condition of the aircraft 102.

The next step in the process flow 200 shown in FIG. 3 is for the streaming analytics module 150 to analyze the data streams as shown by block 218. As mentioned above with respect to FIGS. 1-2, the streaming analytics module 150 may have access to models extracted or built by the model builder 128 based on historical data. Particularly, the model builder 128 may include a learning model processor 220 that is configured to build the aforementioned models based on the historical data. The models may take the form of decision trees, regression models, or any other form.

In an example, the models include rules associated with a component of the aircraft 102 that indicate whether the component is healthy or whether a failure has occurred or is likely to occur. For example, the model may indicate that the maximum flow rate through a particular valve during a particular phase of operation of the aircraft 102 should not exceed a particular value, or should be within a band defined by maximum and minimum values if the valve is health. Otherwise, a failure may have occurred or is likely to occur.

The streaming analytics module 150 then applies these rules from the model to the features extracted from the real time data stream processed in the block 212. In some examples, several rules may be applied to a particular parameter to determine whether a corresponding component is healthy or the aircraft 102 is operating normally. For instance, referring back to the flow valve example, in addition to analyzing flow rate values for a particular phase, the streaming analytics module 150 may also analyze flow rates values in other phases, electric current to a coil of the valve, position, speed, and hydraulic pressures of an actuator controlled by the valve, motion of a control surface or flap controlled by the actuator, etc.

The streaming analytics module 150 may apply rules to each of these variables based on the models generated by the model builder 128. Each of these applications of the rules may be referred to as a task. Thus, as shown in FIG. 3, for example, assuming there are "n" rules associated with a particular model, then there is task_1, task_2 . . . task_n, shown by blocks 222A, 222B . . . 222N, each of which indicates application of a particular rule based on the model.

By applying the rules, the streaming analytics module 150 may be able to predict the condition of the aircraft 102, e.g., whether a failure has occurred or is likely to occur regarding a component on the aircraft 102. In an example, the streaming analytics module 150 may apply a majority rule to determine the condition. For instance, if the majority of tasks indicate that features extracted in real time from the data stream do not meet or satisfy the rules, then the streaming analytics module 150 may determine that failure has occurred, predict that failure is likely to occur, or that an anomaly has occurred.

In another example, the streaming analytics module 150 may compute a probability that a failure has occurred or probability that failure is likely to occur, and may over time determine a cumulative probability or any other statistical measure. If the cumulative probability exceeds a certain threshold probability, then the streaming analytics module 150 may determine that a failure has occurred or is likely to occur.

In another example, each of the tasks may be assigned a weight indicative of relative importance of the task in determining the condition of the component or the aircraft 102. Tasks associated with critical features may be given a larger weight compared to tasks associated with less critical features. The weighted tasks could then be combined to predict or determine the condition of the aircraft 102 or a component thereof.

In an example, the streaming analytics module 150 may be configured to process the results of applying the model through a classifier to predict the condition of the aircraft 102. The classifier can be defined as an algorithm or mathematical operation that maps input information (e.g., the tasks) to a set of classes that characterize the information in categories of interest (e.g., healthy, less healthy, failed).

Classification may involve identifying to which of a set of classes (e.g., occurrence or nonoccurrence of a failure) a new observation may belong, on the basis of a training set of data containing observations (or instances) with a known class. The individual observations may be analyzed into a set of quantifiable properties, known as various explanatory variables or features. As an example, classification may include assigning a respective likelihood to "occurrence of a failure" or "nonoccurrence of a failure" classes as indicated by the tasks based on comparison of real time data features to the precomputed models.

In one example, the classification may be probabilistic in nature. Probabilistic classification algorithms may output a probability of an instance (e.g., results of applying the model) being a member of each of the possible classes: "occurrence of an failure" or "nonoccurrence of a failure." Determining likelihood of the occurrence of a failure may be based on probability assigned to each class. Also, the probabilistic classification can output a confidence value associated with the occurrence of a failure.

Example classification algorithms may include Linear classifiers (e.g., Fisher's linear discriminant, logistic regression, naive Bayes, and perceptron), Support vector machines (e.g., least squares support vector machines), quadratic classifiers, kernel estimation (e.g., k-nearest neighbor), boosting, decision trees (e.g., random forests), neural networks, Gene Expression Programming, Bayesian networks, hidden Markov models, and learning vector quantization. Other example classifiers are also possible.

As an example for illustration, a linear classifier may be expressed as a linear function that assigns a score or likelihood to each possible class k (e.g., "occurrence of a failure" or "nonoccurrence of a failure") by combining a feature vector (vector of the various tasks represented by the blocks 222A, 222B . . . 222N) of an instance (e.g., data points of the data streams at a particular instance or period in time) with a vector of weights, using a dot product. The class with the higher score or likelihood may be selected as a predicted class. This type of score function is known as a linear predictor operation and may have this general form:

$$\text{Score}(X_i, k) = \beta_k \cdot X_i \quad (1)$$

where $X_i$ is the feature vector for instance i, $\beta_k$ is a vector of weights corresponding to category k, and $\text{Score}(X_i, k)$ is the score associated with assigning instance i to category k.

In some examples, the streaming analytics module 150 may encounter a new case or an anomaly (e.g., a combination of extracted features) not predicted by the model or is not addressed by the model. In these examples, the streaming analytics module 150 may communicate information indicating the newly encountered case to the learning model processor 220 for online training of the learning model processor 220 as indicated by block 224. In this manner, the learning model processor 220 may update the models as new cases arise to maintain the models up to date.

The next step in the process flow shown in FIG. 3 is for the streaming analytics module 150 to determine at a decision block 226 whether a failure has occurred, is likely to occur, or an anomaly has occurred during operation of the aircraft 102 based on an aggregation of information. As described above, the streaming analytics module 150 may analyze the streams by applying rules from a model to features extracted from the data streams. The streaming analytics module 150 may repeat this process for various parameters, and may aggregate the information to classify a particular case or instant as representing normal operation or a failure and may generate alerts if a failure occurred or is likely to occur. In some examples, the decision block 226 may be augmented with the analyze streams block 218.

In some examples, as the streaming analytics module 150 may also be configured to determine whether a sequence of events occurred in a particular order and within a predetermined amount of time or not. This determination is represented by event processing block 228 shown in FIG. 328. As an example for illustration, the streaming analytics module 150 may be configured to select portions of the data stream of various parameters corresponding to engine start for the aircraft 102. The streaming analytics module 150 may then seek to identify certain events from the data streams (e.g., sensor data) to check whether particular events happened in a proper order. For instance, to start the engine, a valve opens, then the engine reaches a certain speed, then the pilot commands more fuel to flow to the engine. If the data streams do not indicate that this sequence of events happened in order, then a failure or an anomaly might have occurred. If the sequence of events was proper, but took more time than expected, then a failure or an anomaly might have occurred.

Upon deciding whether a failure has occurred or is likely to occur or an anomaly has occurred, the streaming analytics module 150 may then transmit information including the decision, alerts, etc. to one or more entities. For instance, as shown by block 230, the information may be transmitted to a display device in the cockpit of the aircraft 102 to alert the pilot to a possible failure. The information may also be transmitted to a ground maintenance crew to prepare for further maintenance or immediate maintenance upon landing of the aircraft 102, for example.

The information may be transmitted to other system users 231. For example, the information may be transmitted to a customer decision support teams (e.g., airliners operations managers) at block 232 to enable team members to assess the condition of the aircraft 102, alert proper entities, schedule maintenance, etc. In another example, the information may be displayed via a web user interface 234 to property entities (customers, maintenance, operations manager, etc.).

In another example, the information may be stored at databases 236 for future processing. In some examples, the information may be stored in the DW 122 and may serve as a source of historical data for the model builder 128 for tuning/training of models.

As another example, the streaming analytics module 150 may generate reports 238 for proper parties responsible for operation of the aircraft 102. The reports 238 may include, for example, the decision of whether there was a failure and the information used as a basis to reach the decision. Other information may be included in these reports as well.

Figure 4:
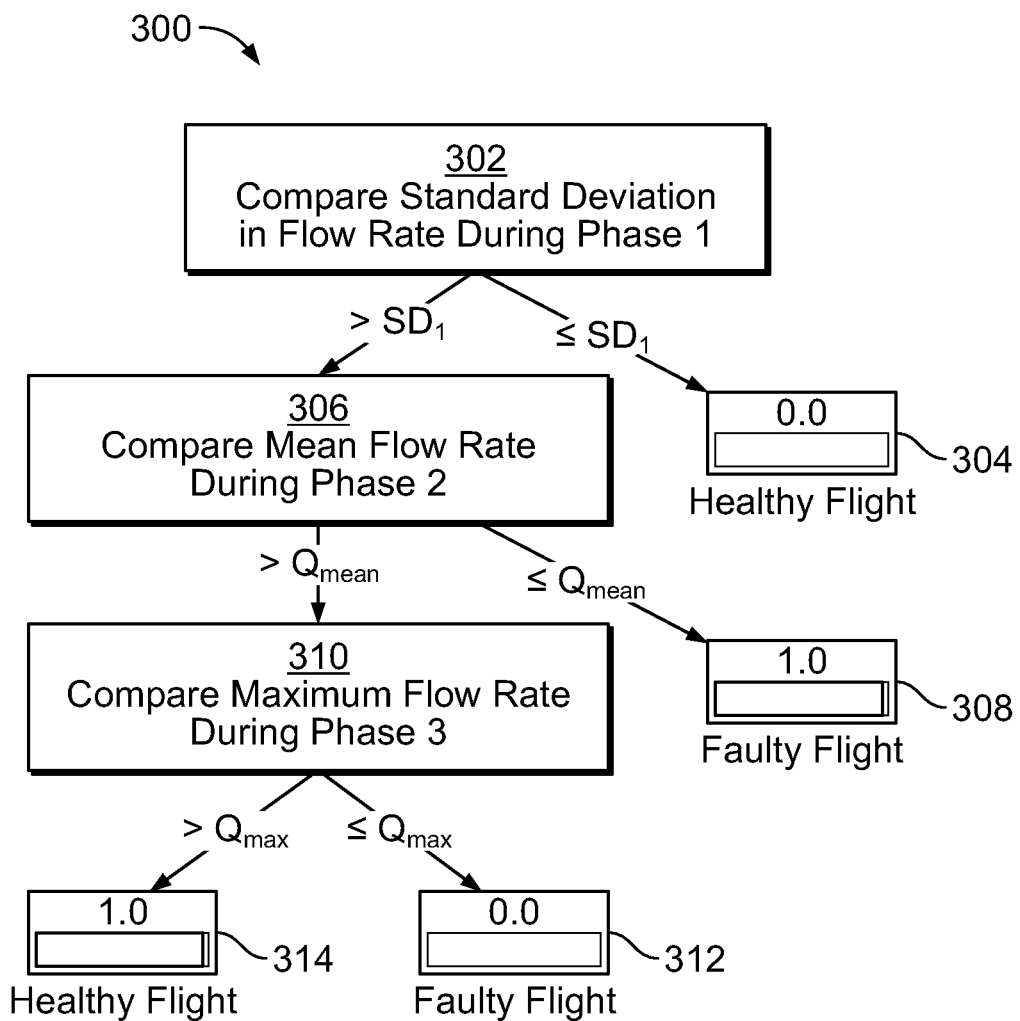
FIG. 4 illustrates a classifier tree for a flow control valve, in accordance with an example implementation.

FIG. 4 illustrates a classifier tree 300 for a flow control valve, in accordance with an example implementation. FIG. 4 is used herein as an example for classifying flights into healthy or unhealthy flights. This may be done as part of the learning process or could be the result of the model building process and used as the real time classification approach for decision support.

The streaming analytics module 150 may have received data streams associated with flow rate of a particular flow valve on the aircraft 102. The streaming analytics module 150 may initially process the data streams as discussed above with respect to the block 212. For instance, the streaming analytics module 150 may select at least one data stream of the data streams, such as the data stream representing flow rate of the flow valve. The streaming analytics module 150 may then buffer or apply a window to the data stream to select portions of the data stream representing flow rates during a particular flight phase or a group of flight phases. As an example, the streaming analytics module 150 may select portions of the data stream that correspond to flow rates through the flow valve during phase 1, phase 2, and phase 3. These phases could be any of the phases discussed above. The phases could be consecutive or might not be consecutive. The streaming analytics module 150 may then extract features from the portions of the data stream such as maximum flow rate, mean flow rate, and standard deviation of flow rate through the valve, etc.

The streaming analytics module 150 may then analyze the portions of data as discussed above with respect to the block 218. As an example, the streaming analytics module 150 may have access to a model for the flow control valve provided by the model builder 128. The streaming analytics module 150 may apply the rules defined by the model to the extracted features from the portions of data.

Referring to FIG. 4, at block 302 of the classifier tree 300, the streaming analytics module 150 may compare standard deviation in flow rate for the flow valve during phase 1 to a value of $SD_1$ (e.g., 0.2) determined by the model builder 128 based on historical data. If the standard deviation is less than or equal to $SD_1$, then the valve is healthy as represented by block 306. The streaming analytics module 150 may then stop the analysis related to the parameter of flow rate for the flow valve. If, however, the standard deviation is greater than $SD_1$, then the streaming analytics module 150 may proceed to the next step of the classifier tree 300.

At block 306 of the classifier tree 300, the streaming analytics module 150 may compare mean flow rate for the flow valve during phase 2 to a value of $Q_{mean}$ (e.g., 140 cubic foot per second) determined by the model builder 128 based on historical data. If the mean flow is less than or equal to $Q_{mean}$, then the valve may be faulty or a failure has occurred as represented by block 308. The streaming analytics module 150 may stop the analysis related to the parameter of flow rate for the flow valve and transmit information indicating that a failure has occurred or is likely to occur on the aircraft 102. If, however, the mean flow is greater than $Q_{mean}$, then the streaming analytics module 150 may proceed to the next step of the classifier tree 300.

At block 310 of the classifier tree 300, the streaming analytics module 150 may compare maximum flow rate for the flow valve during phase 3 to a value of $Q_{max}$ (e.g., 145 cubic foot per second) determined by the model builder 128 based on historical data. If the maximum flow is less than or equal to $Q_{max}$, then the valve may be faulty or a failure has occurred as represented by block 312. The streaming analytics module 150 may stop the analysis related to the parameter of flow rate for the flow valve and transmit information indicating that a failure has occurred or is likely to occur on the aircraft 102. If, however, the maximum flow is greater than $Q_{max}$, then the valve is healthy as represented by block 314.

In an example, the streaming analytics module 150 might not determine whether the valve is healthy at each of the blocks 302, 306, and 310. Instead, the result of each block may be considered as a vote. At the end of executing the classifier tree 300, the streaming analytics module 150 may determine the overall health or condition of the flow valve based for example on a majority vote (or any other technique). For instance, the standard deviation of the flow during phase 1 may be greater than $SD_1$, the mean flow during phase 2 may be greater than $Q_{mean}$, and the maximum flow during phase 3 may be greater than $Q_{max}$. In this example, the streaming analytics module 150 may determine that the valve is healthy because the majority of votes indicate that the valve is healthy. Other techniques, such as cumulative probability of any of the classifier techniques mentioned above, could be used.

The streaming analytics module 150 may perform a similar analysis for thousands of parameters in parallel with the above described analysis. In this manner, the streaming analytics module 150 conducts a real time or near real time analysis of various components and systems of the aircraft 102. The streaming analytics module 150 may then transmit information indicating the condition (healthy or faulty) of the various components and systems of the aircraft 102 to any of the entities discussed above (e.g., the pilot, maintenance, databases, generate reports, user interface, etc.).

Figure 5:
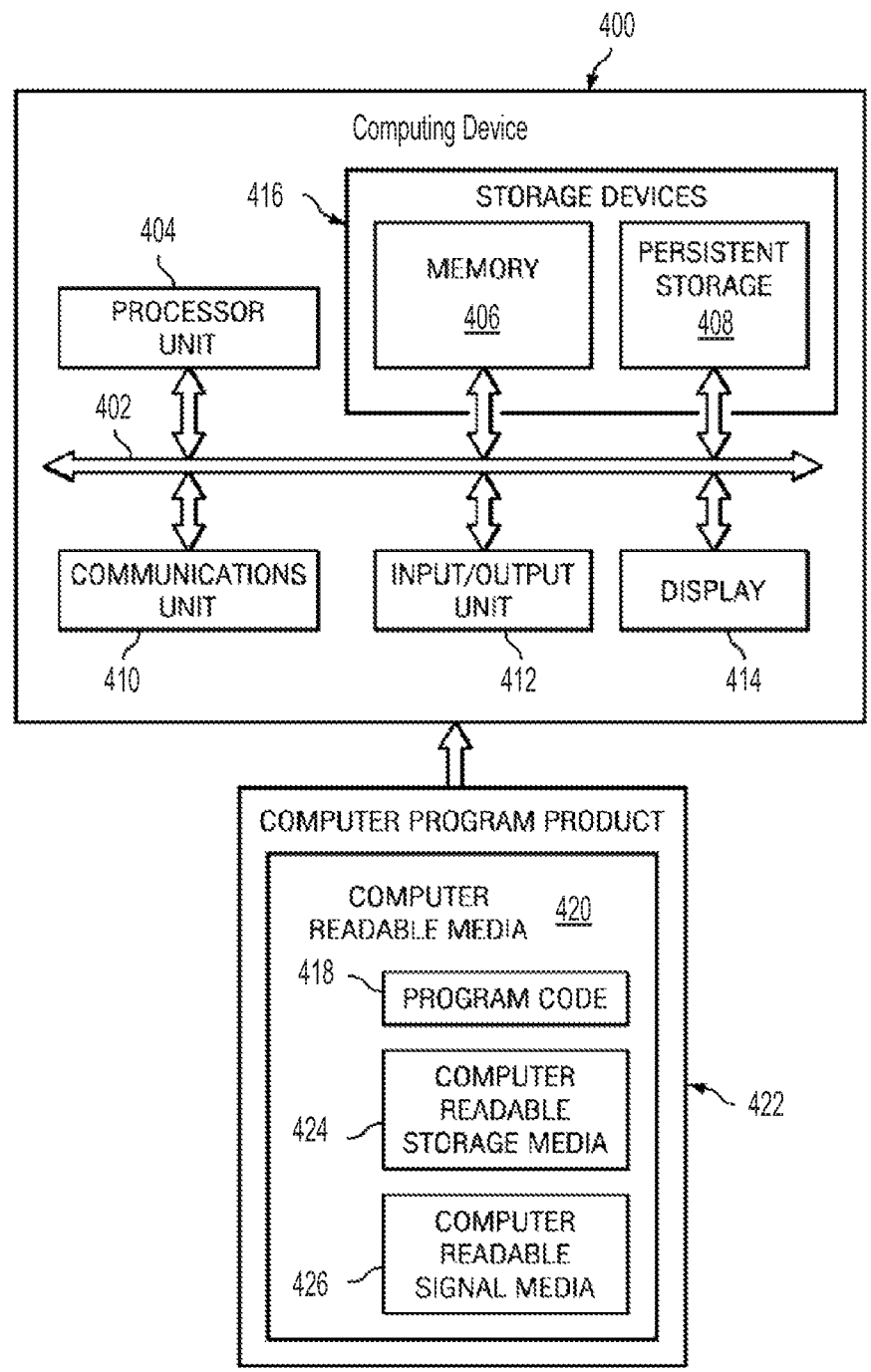
FIG. 5 illustrates a computing device, in accordance with an example implementation.

FIG. 5 illustrates a computing device 400, in accordance with an example implementation. The computing device 400 may represent and perform operations of any of the modules, blocks, or components described above with respect to FIGS. 1, 2, 3, and 4. For instance, the computing device 400 may represent the binary flight data module 104, the flight data conversion module 106 and/or any of the modules shown therein in FIGS. 1-2, the DW 122, the model builder 128 and/or any of the modules shown therein in FIGS. 1-2, the model format module 146, the streaming analytics module 150, the dashboard and reports module 152, or any of the blocks and modules described with respect to FIG. 3.

The computing device 400 includes a bus 402 that communicatively couples a processor unit 404, memory 406, persistent storage 408, communications unit 410, input/output (I/O) unit 412, and display 414.

In the present example, the processor unit 404 is configured to execute software instructions that may be stored in the memory 406. The processor unit 404 may include one or more high performance programmable processors, multi-core processors, or other types of processors.

The memory 406 and the persistent storage 408 are examples of storage devices 416. Generally, a storage device is a piece of hardware that is capable of storing information, for example, data, program code, and/or other suitable information either on a temporary basis and/or a permanent basis. The memory 406, in these examples, may be a random access memory or any other suitable volatile or non-volatile storage device. The persistent storage 408 may be a hard drive, a flash memory, a rewritable optical disk, a rewritable magnetic tape, or some combination of the above. The media used by the persistent storage 408 also may be removable, such as a removable hard drive or flash memory.

The communications unit 410, in these examples, provides for communications with other data processing systems or devices. For instance, the communications unit 410 may be a network interface card. Generally, the communications unit 410 may provide communications through the use of either or both of physical and wireless communications links.

The input/output unit 412 allows for input and output of data with other devices that may be connected to the computing device 400. For example, the input/output unit 412 may provide a connection for user input through a keyboard, a mouse, a touchpad, a microphone for receiving voice commands, and/or some other suitable input device. The input/output unit 412 may send output to a printer and/or to the display 414, which provides a mechanism to display information to a user.

Instructions for the operating system, applications, and/or programs may be located in the storage devices 416, which are in communication with the processor unit 404 through the bus 402. Generally, the processes and operations of the disclosed embodiments may be performed by the processor unit 404 using the instructions stored in an operational form on different physical or tangible computer readable media, such as the memory 406 and/or the persistent storage 408. The computer-implemented instructions are referred to as program code, computer usable program code, or computer readable program code that may be read and executed by a processor in the processor unit 404.

FIG. 5 also illustrates program code 418 that is located in a functional form on computer readable media 420. The computer readable media 420 may be selectively removable and may be loaded onto or transferred to the computing device 400 for execution by the processor unit 404. In the present example, the program code 418 and the computer readable media 420 form computer program product 422. The computer readable media 420 may include computer readable storage media 424 or computer readable signal media 426. The computer readable storage media 424 may take various forms, such as an optical or magnetic disk, a hard drive, a thumb drive, or a flash memory, that is connected to the computing device 400. In some instances, computer readable storage media 424 may not be removable from the computing device 400. In these illustrative examples, the computer readable storage media 424 includes a non-transitory computer readable storage medium.

Alternatively, the program code 418 may be transferred to the computing device 400 using computer readable signal media 426. The computer readable signal media 426 may be, for example, a propagated data signal containing the program code 418. For example, the computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

The different components illustrated for the computing device 400 are not meant to provide architectural limitations to the manner in which different embodiments may be implemented. Different embodiments may be implemented in a computing device or data processing system including components in addition to or in place of those illustrated for the computing device 400. Other components shown in FIG. 5 can be varied from the illustrative examples shown. Generally, the different embodiments may be implemented using any hardware device or system capable of running program code.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

Figure 6:
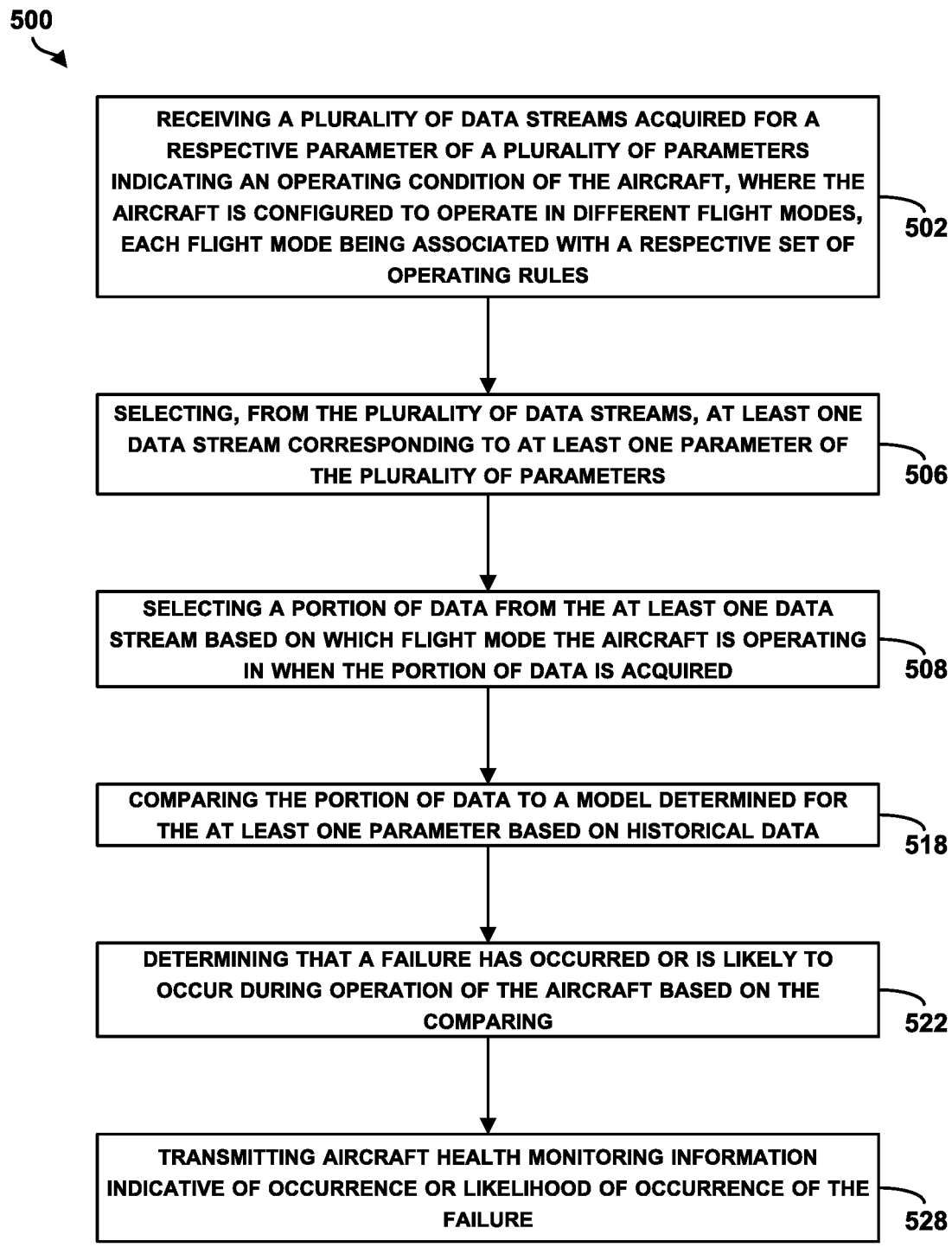
FIG. 6 is a flowchart of a method for flight data processing, in accordance with an example implementation.

FIG. 6 is a flowchart of a method 500 for flight data processing, in accordance with an example implementation. The method 500 could, for example, be performed by the streaming analytics module 150 (represented by the computing device 400). Further, FIGS. 7-13 are flowcharts of methods for use with the method 500.

The method 500 may include one or more operations, or actions as illustrated by one or more of blocks 502-526. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and operations disclosed herein, the flowchart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 500 and other processes and operations disclosed herein, one or more blocks in FIGS. 6-13 may represent circuitry or digital logic that is arranged to perform the specific logical operations in the process.

At block 502, the method 800 includes receiving a plurality of data streams acquired for a respective parameter of a plurality of parameters indicating an operating condition of the aircraft, where the aircraft is configured to operate in different flight modes, each flight mode being associated with a respective set of operating rules and procedures.

As described above with respect to FIGS. 1-3, data streams may be sent from the aircraft 102 and possibly from many other aircrafts to a computing device (the streaming analytics module 150 or a component thereof). The computing device may be onboard the aircraft or may be on the ground and connected to the aircraft via a data link.

The data streams may be received from multiple sources such as databases storing the data streams, directly from an aircraft or multiple aircraft, from a flight management data system coupled to the aircraft, fault data, sensor data, maintenance message, etc. As mentioned above, the aircraft may be configured to operate in any of a plurality of flight modes or phases such as pre-flight, engine taxi out, take-off, climb-out, cruise, descent, approach, landing, taxi-in, engine shut-down, and post flight.

Figure 7:
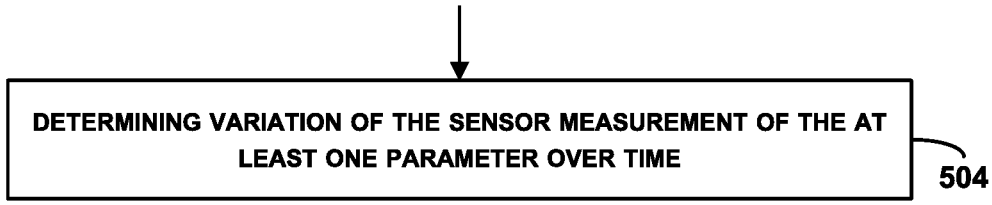
FIG. 7 is a flowchart of a method for use with the method of FIG. 6, in accordance with an example implementation.

Each of the data streams may represent variation of a parameter of a plurality of parameters (e.g., speed, flow rate, pressure, temperature, etc.) that indicate the condition of the aircraft. The computing device may receive the data streams in the form of raw time-spaced data points associated with sensor measurement of the parameters:

FIG. 7 is a flowchart of a method for use with the method 500, in accordance with an example implementation. At block 504, the method includes determining variation of the sensor measurement of the at least one parameter over time. For example, the computing device may include, or may be in communication with, a flight data conversion module/ device (e.g., the flight data conversion module 106) that is configured to convert raw binary data of the data streams into engineering unit as described above. The converted data streams then represent variation of the sensor measurement in engineering units for the corresponding parameters.

Referring back to FIG. 6, at block 506, the method 800 includes selecting, from the plurality of data streams, at least one data stream corresponding to at least one parameter of the respective plurality of parameters. For instance, the computing device may select the data stream representing a particular parameter (e.g., flow rate through a valve) for processing. In an example, the computing device may select several parameters to be processed in parallel as described above to facilitate real-time processing of a large amount of data streams.

At block 508, the method 800 includes selecting a portion of data from the at least one data stream based on which flight mode the aircraft is operating in when the portion of data is acquired. The computing device may include a processing module configured to perform the processes described above with respect to the process streams block 212.

For example, the computing device may select a portion of a particular data stream by buffering or applying a window. Selecting the portions of data may be based on several factors. For example, the computing device may isolate or select the portion of the data stream that correspond to a particular flight mode or phase during which a particular failure might be expected to occur. In another example, the computing device may select the portion of data based on a sequence of events that should occur on the aircraft during a particular phase.

Figure 8:
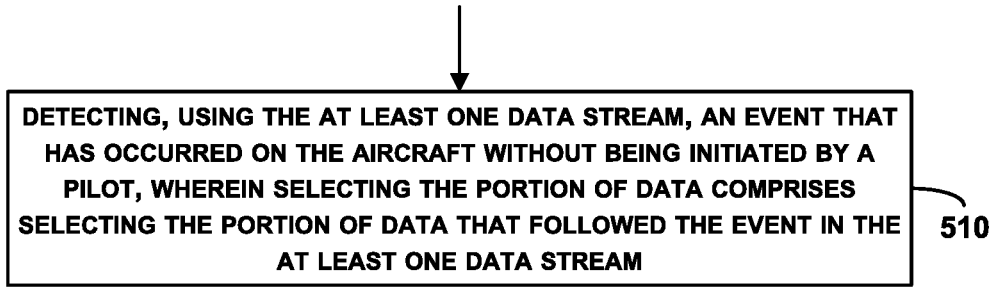
FIG. 8 is a flowchart of a method for use with the method of FIG. 6, in accordance with an example implementation.

FIG. 8 is a flowchart of a method for use with the method 500, in accordance with an example implementation. At block 510, the method includes detecting, using the at least one data stream, an event that has occurred on the aircraft without being initiated by a pilot, wherein selecting the portion of data comprises selecting the portion of data that followed the event in the at least one data stream.

For example, the computing device may select the portion of data based on detecting a special event that triggers the computing device to buffer or apply a window to select the portion of data following the event. The special event may, for instance, be movement of a flap or a control surface without the pilot initiating or commanding such movement.

In addition to selecting the portion of data, the computing device may perform other processes as well. For example, the computing device may compensate for any gaps in the data streams.

Figure 9:
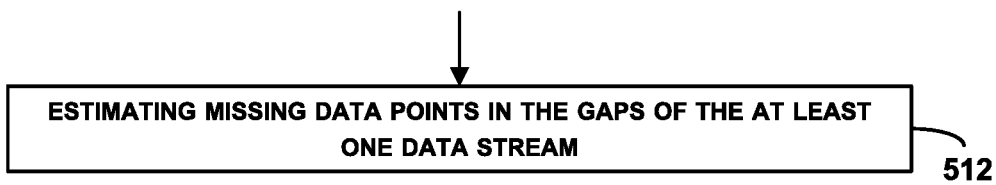
FIG. 9 is a flowchart of a method for use with the method of FIG. 6, in accordance with an example implementation.

FIG. 9 is a flowchart of a method for use with the method 500, in accordance with an example implementation. At block 512, the method includes estimating missing data points in the gaps of the at least one data stream. In an example, the data stream may be obtained at a particular frequency. If the particular frequency is low, then there might be periods of time where no data points exist in the data stream. These gaps may preclude identifying high frequency events, failures, or anomalies that might occur and end quickly. In another example, gaps in the time series data of the data streams may be caused by noise in the sensing equipment or the local environment on the aircraft. To compensate for these gaps and estimate the missing data points, the computing device may, for example, apply a low pass filter to remove any undesirable high frequency noise components within the data stream, and may apply mathematical models to derive a regression curve and estimate missing points in the gaps. In an example, the computing device may interpolate between data points and or apply some other mathematical technique to estimate the missing points.

Figure 10:
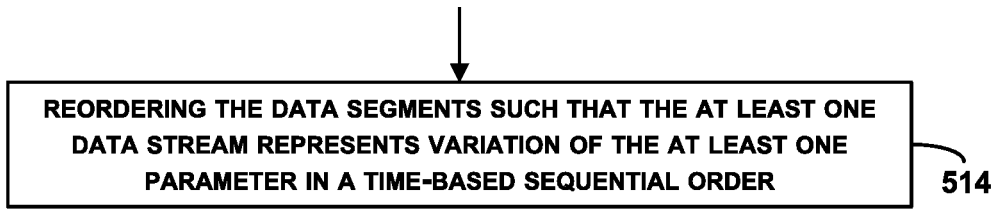
FIG. 10 is a flowchart of a method for use with the method of FIG. 6, in accordance with an example implementation.

In still another example, the streaming analytics module 150 may combine two or more data streams obtained from multiple respective sources (e.g., fault data, sensor data, maintenance messages, etc.) to construct a single data stream. FIG. 10 is a flowchart of a method for use with the method 500, in accordance with an example implementation. At block 514, the method includes reordering the data segments such that the at least one data stream represents variation of the at least one parameter in a time-based sequential order. For example, the computing device may receive a data stream from the DW 122 and another from the stream processing module 210. Although time series data streams should be received in the order the data points are captured, in some examples, the data streams may arrive out of order form a time stand point. The computing device may thus reorder data segments from the different data streams to construct the data stream such that the data stream represents variation of a corresponding parameter in a time-based sequential order.

Figure 11:
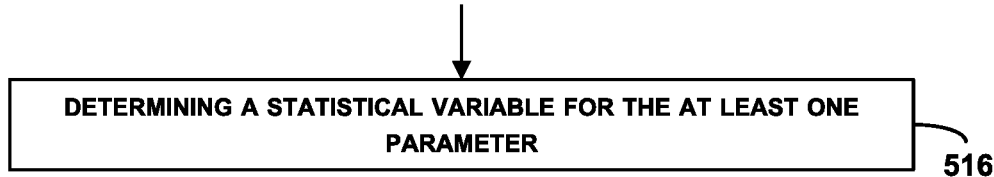
FIG. 11 is a flowchart of a method for use with the method of FIG. 6, in accordance with an example implementation.

In examples, the computing device may further extract features from the data streams in real time that indicate characteristics of the corresponding parameters. FIG. 11 is a flowchart of a method for use with the method 500, in accordance with an example implementation. At block 516, the method includes determining a statistical variable for the at least one parameter. For example, the computing device may determine statistical variables such as maximum value, minimum value, standard deviation, mean, etc. for a particular parameter.

Referring back to FIG. 6, at block 518, the method 500 includes comparing the portion of data to a model determined for the at least one parameter based on historical data. The computing device may have access to models extracted or built by a model builder (e.g., the model builder 128) based on historical data. The models may take the form of decision trees, regression models, or any other form. In an example, the models include rules that should be satisfied if an associated component of the aircraft is healthy. The computing device may then apply these rules from the model to the real time data stream to compare the model to the data stream and determine whether the data stream complies with what is predicted by the model.

Figure 12:
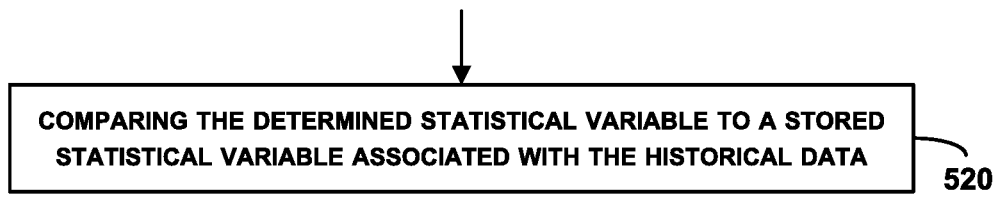
FIG. 12 is a flowchart of a method for use with the method of FIG. 6, in accordance with an example implementation.

FIG. 12 is a flowchart of a method for use with the method 500, in accordance with an example implementation. At block 520, the method includes comparing the determined statistical variable to a stored statistical variable associated with the historical data. For example, to apply the rules of the model to the data stream, the computing device may compare statistical variables determined by the model based on the historical data to the statistical variable extracted from the real time data stream.

Referring back to FIG. 6, at block 522, the method 800 includes determining that a failure has occurred or is likely to occur during operation of the aircraft based on the comparing. By applying the rules, the computing device may be able to predict the condition of the aircraft, e.g., whether a failure has occurred or is likely to occur regarding a component on the aircraft as described above with respect to the analyze streams block 218 and the decision block 226. In an example, the computing device may apply a majority rule to determine the condition. For instance, if the majority of features extracted in real time from the data stream does not meet or satisfy the rules, then the computing device may determine that there is a failure or predict that a failure is likely to occur. In another example, the computing device may compute a probability that a failure has occurred or is likely to occur, and may over time determine a cumulative probability or any other statistical measure. If the cumulative probability exceeds a certain threshold probability, then the computing device may determine that a failure has occurred or that failure is likely to occur.

Figure 13:
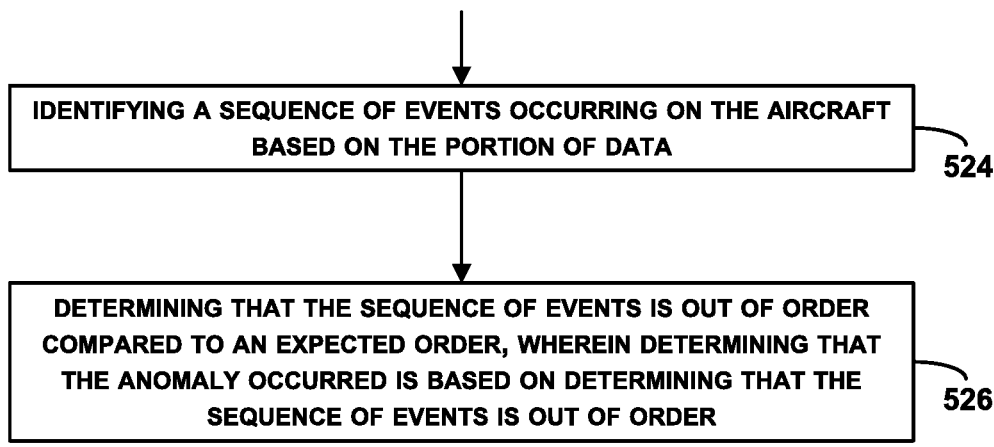
FIG. 13 is a flowchart of a method for use with the method of FIG. 6, in accordance with an example implementation.

FIG. 13 is a flowchart of a method for use with the method 500, in accordance with an example implementation. At block 524, the method includes identifying a sequence of events occurring on the aircraft based on the portion of data, and at block 526 the method includes determining that the sequence of events is out of order compared to an expected order, where determining that the failure has occurred or is likely to occur is based on determining that the sequence of events is out of order. In some examples, to determine whether a failure has occurred, the computing device may determine whether a sequence of events occurred in a particular order and within a predetermined amount of time or not. For example, the computing device may seek to identify certain events from the data streams (e.g., sensor data) to check whether particular events happened in a proper order. If the data streams do not indicate that this sequence of events happened in order, then a failure might have occurred or is about to occur. If the sequence of events was proper, but took more time than expected, then a failure may have occurred.

Referring back to FIG. 6, at block 528, the method 500 includes transmitting aircraft health monitoring information indicative of occurrence or likelihood of occurrence of the failure. Upon deciding whether a failure has occurred or is likely to occur, the computing device may then transmit information including the decision, alerts, etc. to one or more entities downstream system users. Examples of these entities may include one or more of the pilot, ground maintenance crew, customer decision support teams, and databases. The computing device may also generate reports for proper parties responsible for operation of the aircraft based on the decision of whether a failure occurred or not.

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method implemented by a computing device for data stream analytics for an aircraft, the method comprising:
   receiving a plurality of data streams acquired for a respective parameter of a plurality of parameters indicating an operating condition of the aircraft, wherein the aircraft is configured to operate in different flight modes, each flight mode being associated with a respective set of operating rules;
   selecting, from the plurality of data streams, at least one data stream corresponding to at least one parameter of the plurality of parameters;
   selecting a portion of data from the at least one data stream based on which flight mode the aircraft is operating in when the portion of data is acquired;
   comparing the portion of data to a model determined for the at least one parameter based on historical data;
   determining that a failure has occurred or is likely to occur during operation of the aircraft based on the comparing; and
   transmitting aircraft health monitoring information indicative of occurrence or likelihood of occurrence of the failure.

2. The method of claim 1, wherein the plurality of data streams are acquired during different flights of the aircraft or different flight segments.

3. The method of claim 1, wherein the at least one data stream includes gaps between data points of the at least one data stream, and wherein the method further comprises:
   estimating missing data points in the gaps of the at least one data stream.

4. The method of claim 1, wherein the at least one data stream is constructed from data segments obtained from multiple respective sources, the method further comprising:
   reordering the data segments such that the at least one data stream represents variation of the at least one parameter in a time-based sequential order.

5. The method of claim 1, further comprising:
   identifying a sequence of events occurring on the aircraft based on the portion of data; and
   determining that the sequence of events is out of order compared to an expected order, wherein determining that the failure has occurred or is likely to occur is based on determining that the sequence of events is out of order.

6. The method of claim 1, further comprising:
   determining a statistical variable for the at least one parameter, wherein comparing the portion of data to the model determined for the at least one parameter based on the historical data comprises: comparing the determined statistical variable to a stored statistical variable associated with the historical data.

7. The method of claim 6, wherein the statistical variable is one statistical variable among a group of statistical variables determined using the portion of data, wherein comparing the portion of data to the model comprises comparing the statistical variables to respective threshold values associated with the historical data, and wherein determining that the failure has occurred or is likely to occur is based on a majority of the statistical variables meeting the respective threshold values.

8. The method of claim 1, wherein receiving the plurality of data streams comprises receiving raw time-spaced data points associated with sensor measurement of the at least one parameter from a flight data warehouse coupled to the aircraft, the method further comprising:
determining variation of the sensor measurement of the at least one parameter over time.

9. The method of claim 1, further comprising:
detecting, using the at least one data stream, an event that has occurred on the aircraft without being initiated by a pilot, wherein selecting the portion of data comprises selecting the portion of data that followed the event in the at least one data stream.

10. The method of claim 1, wherein the different flight modes comprise pre-flight, engine taxi out, take-off, climb-out, cruise, descent, approach, landing, taxi-in, engine shutdown, and post flight.

11. A flight data processing system comprising:
a flight data conversion computing device having one or more processors configured to (i) receive, from a flight data warehouse, raw time-space data points of a plurality of data streams acquired for a respective parameter of a plurality of parameters indicating an operating condition of an aircraft, wherein the aircraft is configured to operate in different flight modes, each flight mode being associated with a respective set of operating rules, and (ii) convert the raw time-spaced data points of the plurality of data streams into measurements representing variation of the plurality of parameters over time;
a database in communication with the flight data conversion computing device and configured to store converted plurality of data streams generated by the flight data conversion computing device; and
a streaming analytics module in communication with the flight data conversion computing device or the database, wherein the streaming analytics module comprises:
one or more processors, and
memory storing thereon instructions, that when executed by the one or more processors, cause the streaming analytics module to perform operations comprising:
selecting, from the converted plurality of data streams, at least one data stream corresponding to at least one parameter of the plurality of parameters,
selecting a portion of data from the at least one data stream based on which flight mode the aircraft is operating in when the portion of data is acquired,
comparing the portion of data to a model determined for the at least one parameter based on historical data,
determining that a failure has occurred or is likely to occur during operation of the aircraft based on the comparing, and
transmitting aircraft health monitoring information indicative of occurrence or likelihood of occurrence of the failure.

12. The flight data processing system of claim 11, wherein the database is configured to store the converted plurality of data streams in a Hadoop Distributed File System to facilitate parallel processing of the converted plurality of data streams by the streaming analytics module.

13. The flight data processing system of claim 11, further comprising:
a historical data processing computing device in communication with the database and configured to determine the model based on historical converted plurality of data streams received from the database.

14. The flight data processing system of claim 11, wherein the operations further comprise:
determining a statistical variable for the at least one parameter, wherein comparing the portion of data to the model determined for the at least one parameter based on the historical data comprises: comparing the determined statistical variable to a stored statistical variable associated with the historical data.

15. The flight data processing system of claim 14, wherein the statistical variable is one statistical variable among a group of statistical variables determined using the portion of data, wherein comparing the portion of data to the model comprises comparing the determined statistical variables to respective threshold values associated with the historical data, and wherein determining that the failure has occurred or is likely to occur is based on a majority of the statistical variables meeting the respective threshold values.

16. The flight data processing system of claim 11, wherein the operations further comprise:
detecting, using the at least one data stream, an event that occurred on the aircraft without being initiated by a pilot, wherein selecting the portion of data comprises selecting the portion of data that followed the event in the at least one data stream.

17. A non-transitory computer readable medium having stored therein instructions that, in response to execution by a computing device for data stream analytics for an aircraft, cause the computing device to perform operations comprising:
receiving a plurality of data streams acquired for a respective parameter of a plurality of parameters indicating an operating condition of the aircraft, wherein the aircraft is configured to operate in different flight modes, each flight mode being associated with a respective set of operating rules;
selecting, from the plurality of data streams, at least one data stream corresponding to at least one parameter of the plurality of parameters;
selecting a portion of data from the at least one data stream based on which flight mode the aircraft is operating in when the portion of data is acquired;
comparing the portion of data to a model determined for the at least one parameter based on historical data;
determining that a failure has occurred or is likely to occur during operation of the aircraft based on the comparing; and
transmitting aircraft health monitoring information indicative of occurrence or likelihood of occurrence of the failure.

18. The non-transitory computer readable medium of claim 17, wherein the at least one data stream is constructed from data segments obtained from multiple respective sources, and wherein the operations further comprise:
reordering the data segments such that the at least one data stream represents variation of the at least one parameter in a time-based sequential order.

19. The non-transitory computer readable medium of claim 17, wherein the operations further comprise:
identifying a sequence of events occurring on the aircraft based on the portion of data; and determining that the sequence of events is out of order compared to an expected order, wherein determining that the failure has occurred or is likely to occur is based on determining that the sequence of events is out of order.

20. The non-transitory computer readable medium of claim 17, wherein the computing device is configured to perform the operations in real time and is located onboard the aircraft or on ground and connected to the aircraft via a data link.

\* \* \* \* \*